Sept. 9, 1969    D. A. DONOVAN    3,465,577
AUTOMOBILE CONTROL MANIPULATING APPARATUS
Filed Sept. 28, 1967    3 Sheets-Sheet 1
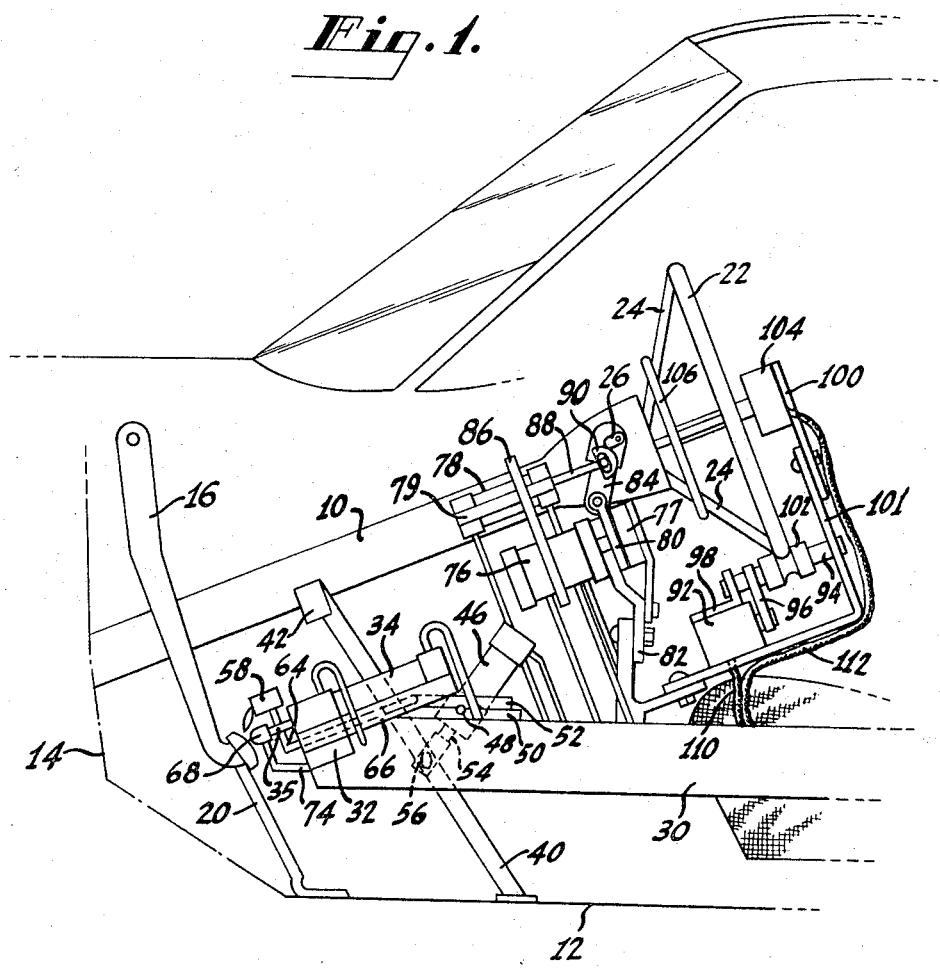
INVENTOR
DAVID A. DONOVAN
BY Simon Yaffee
ATTORNEY

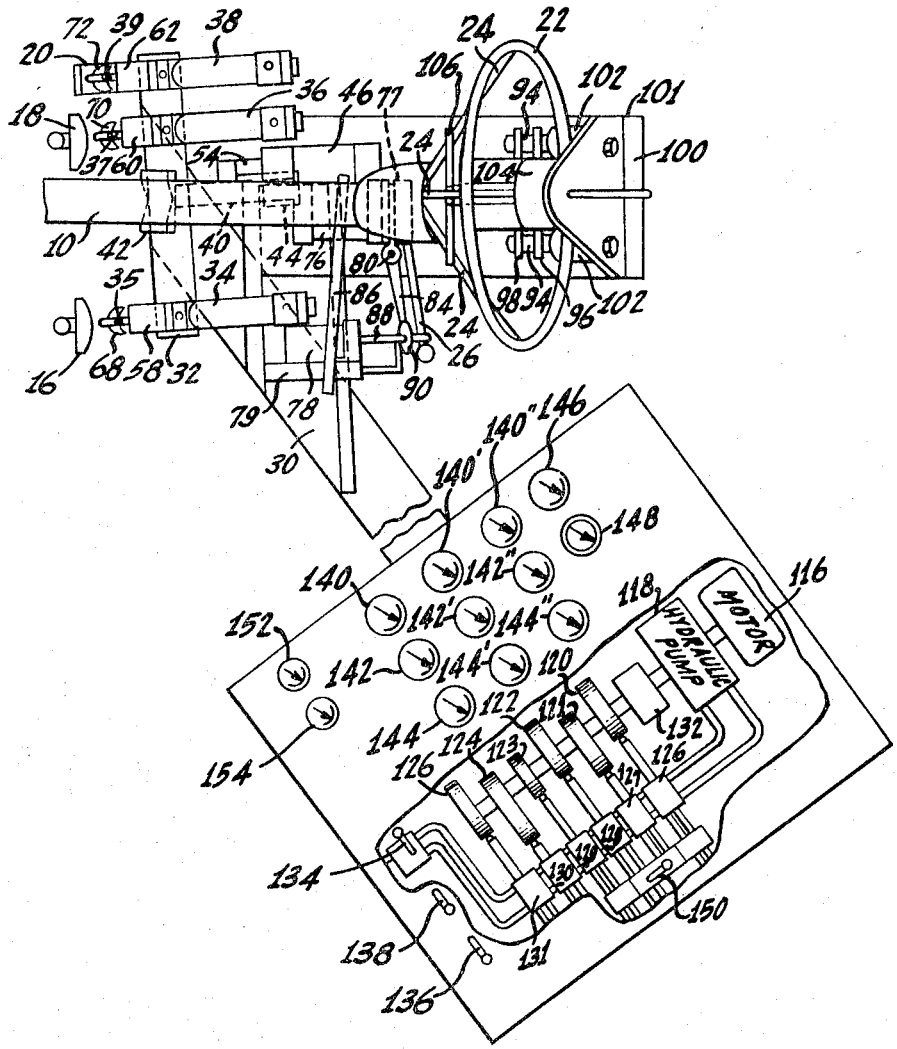

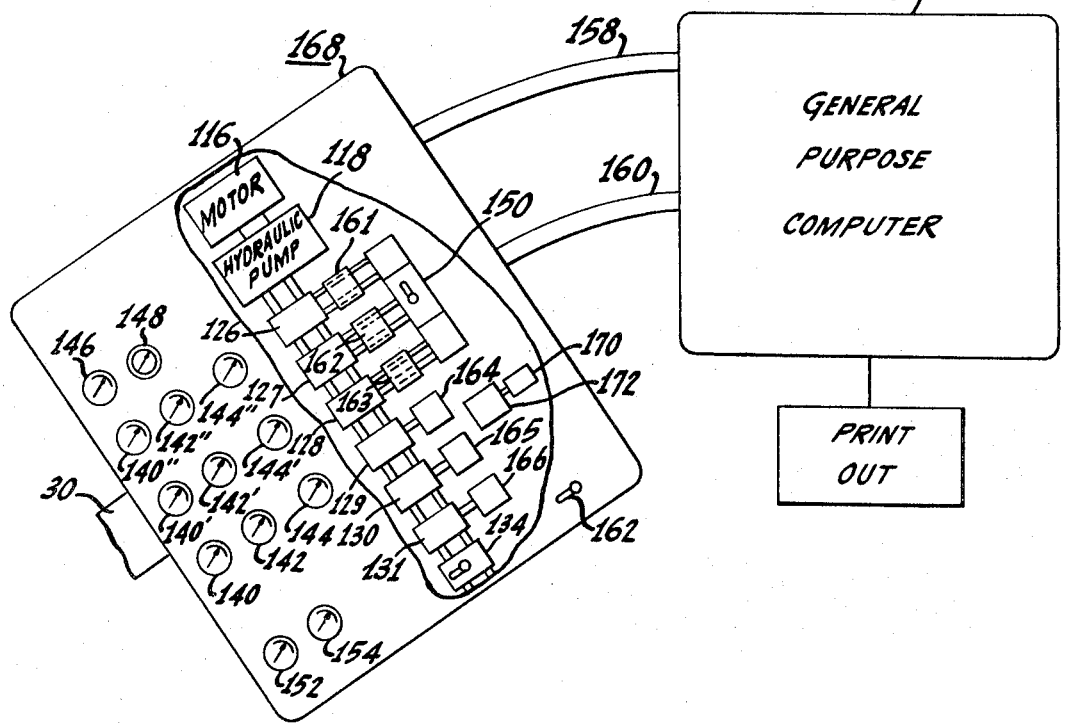

United States Patent Office 3,465,577
Patented Sept. 9, 1969

3,465,577
AUTOMOBILE CONTROL MANIPULATING
APPARATUS
David A. Donovan, Taylor, Mich., assignor to RCA
Corporation, a corporation of Delaware
Filed Sept. 28, 1967, Ser. No. 671,358
Int. Cl. F16d 67/00
U.S. Cl. 73—116                                    6 Claims

ABSTRACT OF THE DISCLOSURE

In making various tests on an automobile, the controls thereof must be operated in a predetermined, programmed manner. Apparatus is disclosed for manipulating the accelerator, the brake, the clutch pedal, and the gear shift lever in a programmed manner. Apparatus is also disclosed for manipulating the steering wheel.

BACKGROUND

This invention relates to apparatus for manipulating the controls of a machine and more particularly to apparatus for manipulating the controls of an automobile.

In testing the performance of an automobile and in analyzing the exhaust gas given off by the automobile, it is advantageous to operate the automobile controls in a programmed manner. If all tested cars are operated in the same manner during the test thereof, then the performance of the car and the analysis of the exhaust gases produced by the cars can be compared and norms and attainable goals of operation and of exhaust gas composition can be established. It is difficult, if not impossible, for a human operator to operate the controls of each of a large number of automobiles in exactly the same manner. Furthermore, the response of the controls themselves to the actuating means, that is, the force necessary to move a control at various portions of its travel, may indicate whether or not the automobile is properly operative.

It is an object of this invention to provide a programmable apparatus for operating the controls of machinery such as an automotive vehicle.

It is a further object of this invention to provide apparatus for indicating the response of the conrtols themselves to the control operating apparatus.

SUMMARY OF THE INVENTION

In accordance with the invention, an apparatus, which may be put into the driver's compartment of an automobile through an open door thereof, is provided for manipulating the accelerator pedal, the brake pedal, the clutch pedal, if there be one, and for measuring the distance through which the pedals are moved and also for measuring the effort required to move the pedals. The apparatus also operates the gear shift lever in desired timed relation with respect to the operation of the several pedals. This apparatus may be braced between the steering column of the automobile and the floor of the driver's compartment. All the power lines and the measuring lines of the apparatus extend through a single tubular support connecting the apparatus in the driver's compartment with a programmer and with indicating instruments outside the compartment. If desired, means may be provided to rotate the steering wheel as well as to positon it and to indicate the effort required to do so.

BRIEF DESCRIPTION OF THE DRAWINGS

The invention will be better understood by reading the following description in connection with the accompanying drawing in which:

FIG. 1 is a side elevational view of the drive compartment of an automobile including the control manipulating apparatus of this invention, part of the automobile and of this apparatus being broken away, FIG. 2 is a plan view of the control manipulating apparatus shown in relationship to the steering wheel and the control pedals of an automobile, parts of the appaartus being broken away, and FIG. 3 is a fragmentary plan view of a modified control manipulating apparatus.

DESCRIPTION

Turning first to FIG. 1, the steering column 10 is shown in relation to the floor 12 and the fire wall 14 of an automobile. A clutch pedal 16 (FIGS. 1 and 2) is pivoted in a known manner from the fire wall 14. The brake pedal 18, shown in FIG. 2, is behind the clutch pedal 16 and therefore does not show in FIG. 1. The accelerator pedal 20, which is pivoted on the floor 12 of the car is adjacent and to the right of the brake pedal as viewed by the operator of the automobile. The steering column 10 is surmounted by a steering wheel 22 having dished spokes 24. A gear shift lever 26 extends from the steering column 10 just below the wheel 22. For convenience of illustration, the gear shift lever 26 is shown as extending to the driver's left from the steering column, contrary to the general usage. The structure to be described for controlling and determining the performance of the lever 26 can be in the manner taught readily adapted for use where the lever 26 extends to the driver's right.

The apparatus for manipulating the several controls mentioned comprises a support 30 that may be tubular. A support bar 32 is attached to the forward end of the support tube 30 at such an angle thereto that the support tube 30 may extend into the open driver's door (not shown) of the car and the bar 32 may extend perpendicular to the length of the car and parallel to the floor 12 thereof. Three hydraulic cylinders 34, 36, and 38 are mounted on the bar 32 and extend downward in a forward direction, the cylinder 34 being adjustable to be lined up with the clutch pedal 16, the cylinders 36 and 38 being adjustable along the bar 32 to be lined up with the brake pedal 18 and the accelerator pedal 20 respectively. The cylinders 34, 36, and 38 extend at an angle with the floor 12 such that throughout the motion of the moving elements 35, 37, and 39 respectively, of the cylinders 34, 36, and 38, the moving elements 35, 37, and 39 contact their respective pedals 16, 18, and 20.

A support 40 is provided for the support tube 30. This support 40 is braced between the steering column 10 and the floor 12 of the car, a portion 42 of the top of this support 40 being shaped to receive the steering column 10 and a foot 44 being provided at the bottom of the support 10 to contact the floor 12. A hydraulic cylinder 46 is pivoted on the tubular support 30 by means of a pivot 48 which extends between the plates 50 and 52 which are fixed to the support 30. The end of the moving element 54 of the cylinder 46 is fixed at an adjustable angle to the support 40 as by a pivot 56 (FIG. 1). While the relative angle of the support 40 and the moving element 54 may be adjusted for any car being tested, the adjustment once made need not be varied during the test of this or similar cars. Therefore, upon feeding fluid under pressure to the hydraulic cylinder 46 via the support 30, the several cylinders 34, 36, and 38 are supported on the support 40 in an operative position with respect to the several control pedals 16, 18, and 20 of the car.

Means are provided to indicate when, during the motion thereof, the moving elements 35, 37, and 39 contact their respective pedals 16, 18, and 20 and at what positions the moving elements 35, 37, and 39 are located at any moment, and therefore how far the pedals have moved at any moment, and also what pressure is required to move the pedals. A feeler gauge 58, 60, and 62 is positioned on the respective moving elements 35, 37, and 39, the feelers of the several gauges 58, 60, and 62 being so positioned that they will be deflected just as the front end of the respective moving elements 35, 37, and 39 contact their respective pedals 16, 18, and 20. Furthermore, to indicate the position of the moving element at all times, a core 64 (FIG. 1) is attached to the moving element 35 and extends backwards into a coil 66 which is individual to a core 64. Respective cores are fixed to the other movable elements 37 and 39 but these cores have not been shown to avoid unnecessary confusion in the drawing. To measure the pressure applied to move the pedals 16, 18, and 20, respective pressure gauges 68, 70, and 72 are mounted on the front ends of the moving elements 35, 37, and 39. These pressure gauges 68, 70, 72 may be of the piezoeletcric type, having leads 74, or any other known type of pressure gauge may be used with the moving elements 35, 37, and 39.

For the purpose of control of the gear shift lever 26 of the car, two further hydraulic cylinders 76 and 78 may be provided. The cylinder 76 may be of the rotary type, that is the arm 80 rotates about the axis of the cylinder 76. The cylinder 76 is supported in adjustably fixed relation to the tubular support 30 by an adjustable support means 82. A rod 84 is pivoted on the arm 80 to rotate therewith about the axis cylinder 76, the arm 84 being rotatable in a plane perpendicular to the plane of rotation to the arm 80. The end of the arm 84 is removably fixed to the gear shift lever 26. The cylinder 78 is supported by an adjustable clamp 86 from the cylinder 76. The movable element 88 of the cylinder 78 is fastened, as by a lost motion means 90 to the arm 84. Therefore, by controlling the flow of fluids to the cylinders 76 and 78, the gear shift lever 26 may be moved to its several positions. For automatic shift cars that have no clutch and that require only rotary motion of the shift lever 26, the cylinders 34 and 78 need not be operated, or if only automatic shift cars are to be controlled by the described apparatus, these cylinders and their controls may be omitted.

If it is desired to manipulate the steering wheel 22 of the car, a motor 92 is adjustably mounted on the support 30. The motor 92 rotates a pair of shafts 94, see FIG. 2, by means of a belt 96. One end of each of the shafts 94 rotates in respective bearings in a bracket 98 which may be fixed to the motor 92. The other end of the shafts 94 rotate in bearings of a support plate 100 on which the motor 92 is mounted. Each of the shafts 94 have thereon a roller 102 having a soft surface to contact and rotate the steering wheel rim 22. Therefore by rotation of the motor 92, the steering wheel 22 may be rotated. By measuring the current taken by motor 92 as will be explained, the power necessary to rotate the steering wheel 22 will be known. If it is desired to note the positions of the steering wheel 22, position transmitter 104 of any known type may be coupled to the spokes 24 of the steering wheel 22 by a spider 106. The transmitter 104 may be adjustably fixed in position by means of a joint 101 on the support plate 100. The tubes for leading fluids to and away from the hydraulic cylinders 34, 36, 38, 46, 76, and 78, the electrical wires such as 74 for the pressure indicators, the electrical wires for the feeler gauges 58, 60, and 62, (not shown) and the electrical wires 110 and 112 for the motor 92 and for the electrical position transmitter 104 respectively extend through tubular support 30 into the console 114 (FIG. 2).

The console 114 contains a motor 116 which drives a hydraulic pump 118 and a plurality of cams 120 to 125 by means of a speed reducer and clutch 132. Control of the fluid fed from the pump 118 to the cylinder 46 is by means of a manually controlled valve 134 which, in one of its positions, causes the moving element 54 to move out from the cylinder 46 and in another position causes the moving element 54 to move back into the cylinder 46, while an intermediate position of a control valve 134 causes the moving element 54 to remain in a fixed position. A clutch control lever 136, controls the clutch 132 to cause the several cams 120 to 125 to operate their respective valves 126 to 131 to control the flow of fluids to the several cylinders 34, 36, 38, 76, and 78. The valve 131 for example controls the operation of the cylinder 38. The valve 130 controls the operation of the cylinder 36. The valve 129 controls the operation of the clutch pedal 34. Either the valve 128 or 127 controls the operation of the rotary cylinder 76 as will be explained, and the valve 126 controls the operation of the cylinder 78.

When a car that is being tested is of the automatic shift type, there is no need for the cylinder 34 or for the cylinder 78, and the rotary cylinder 76 is operated in a manner suitable to shift gears of an automatic shift car. The valve 150 is provided which, in one of its two positions feeds the fluid from the valve 128 to the rotary cylinder 76 and feeds fluids from the valve 129 to the clutch cylinder 76 and also feeds fluid from the valve 126 to the cylinder 78. In this position of the valve 150, manual shift cars are to be tested. In the other of the positions of the valve 150, fluid is cut off from the cylinders 34 and 78 and fluid from the valve 127 is fed to the rotary cylinder 76, for testing an automatic shift car. In either position of the valve 150, due to the rotation of the cams 120 to 125, fluid is fed to the several cylinders in a programmed manner to operate the automobile for test purposes.

To test the steering mechanism of the automobile, a motor drive and reverse switch 138 for the motor 92 is provided. In one position of the switch 138, the motor 92 rotates the wheel 22 clockwise as viewed by the driver. In another position of the switch 138, the motor 92 rotates the wheel 22 counterclockwise, while in an intermediate position of the switch 138, the motor 92 does not rotate. As stated above, measure of the current flow to the motor 92 is an indication of the effort required to turn the steering wheel 22. The rotation indicator 104, turns with the wheel 22 and indicates the position of the wheel as will be more fully explained.

Several meters are mounted on the console 114. A group of three meters are provided for each of the cylinders 34, 36, and 38 and one meter is provided for each of the cylinders 76 and 78. The first meter 140 of the group provided for the cylinder 34 indicates the position at which the moving element 35 of the cylinder 34 touches the clutch pedal. That is, the electric signal provided by the coil 66 is applied to the meter 140 and these signals are cut off therefrom when the feeler switch touches the pedal 16. The needle of the meter 140 then retains its position until reset. Since the current from the coil 66 is not cut off from the meter 142, the meter 142 indicates the position, at any time, of the moving element 35. Comparison of the indication of the meters 140 and 142 indicates how far the pedal 16 has been moved. A meter 144 indicates the pressure applied by the moving element 35 at any particular moment. The meters 140', 142', and 144' give similar information about the brake pedal 18, and the meters 140", 142", and 144" give similar information about the accelerator pedal 20. The meters 146 and 148 give the effort required to turn the steering wheel 22 and the position thereof respectively. Since a steering wheel may be turned through several revolutions, the indicator of the meter 148 may be geared down whereby one rotation of the needle of the meter 148 indicates the position through several rotations of the steering wheel 22. The position of the gear shift lever 26 may be checked by a glance at meters 152 and 154 respectively. The position of the moving element 88 of the cylinder 78 may be determined by a coil 79 and a cooperating plunger attached to the moving element 88, and this determination may be indicated by the meter 152 as down or up. The rotary position of the moving element 80 of cylinder 76 may be determined by a rotary position transmitter 77 of the type similar to that used with the steering wheel 22 and having the reference character 104. The rotary position of the shift lever 26 may be indicated by the meter 154.

To test a car which is on a test stand, (not shown) the driver's door is opened and the tube 30, with the parts attached thereto is put in the car. The support 40 is placed between the floor 12 and the steering column 10 and then the control valve 134 is operated to cause the moving element 54 to lift the support tube 30 an amount required to place the cylinders 34, 36, and 38 into positions to operate their respective pedals 16, 18, and 20, the element 54 being pivoted with respect to the support 40 if necessary in so positioning the cylinders 34, 36, and 38. When the cylinders 34, 36, and 38 are properly positioned, the valve 134 is moved to its hold position. The cylinders 78 and 76 are moved to their operative positions and the arm 84 is fixed to the gear shift lever 26. If desired, the rollers 102 are placed in contact with the wheel 22 and the spider 106 is positioned on the spokes 24. Then the control clutch lever 136 is thrown to the point where the several cams 121 to 125 are rotated and the operator notes the several meters on the console 114. If desired, the several meters may include or take the form of tape recording apparatus.

Various information concerning operation of the car can be ascertained by running it on a test stand in a programmed manner. For example, the ease or difficulty of operating the several controls may be determined. The gases exhausted by the engine of the car may be collected during the programmed running of the engine. If desired, the four wheels of the car may be turned by a suitable means on the test stand and the operation of the brakes may be tested for foot pedal pressure and for brake fading and failure. Also, the steering effort at various positions of the steering wheel 22 may be determined by manipulation of motor control switch 138.

As is known, automatic shift cars do not have a clutch and do not require motion of the gear shift lever 26 in a plane through the steering column. When testing an automatic shift car, the valve 150 will be adjusted to cut off fluid from the cylinder 78 which moves the gear shift lever 26 in a plane parallel to the axis of the steering column 10 and also to cut off fluid from the clutch cylinder 34. Furthermore, by this adjustment of the valve 150 the rotary cylinder 76 will be operated to move the shift lever 26 by the cam 121 in a manner proper for automatic shift automobiles.

It is an established knowledge that an electrically operated computer of either digital or analog design may receive, as signals, electrical voltages or currents analogous to pressures, distances traveled, timing relationships, or other parameters, and by means of an internally stored program process these incoming signals to derive new signals which are directly or indirectly related to the incoming signals. These newly derived signals are converted into a suitable electrical voltage and current form and sent over wires to precisely control actuators and other electrical mechanical devices in accordance with the stored program. Therefore a general purpose computer can be programmed to operate the described control manipulating apparatus. Furthermore, it may be easier and more convenient to vary the programming of a general purpose computer than to cut new cams (120-125 of FIG. 2) if it is decided to change the test procedure of the automobile being tested.

Reference is had to FIG. 3 in which the same reference characters that are used in FIG. 2 are used to indicate similar elements found in both FIGS. 2 and 3. The console 168 of FIG. 3 is used instead of the console 114 of FIG. 2 when the programming of the operations of the several controls is to be accomplished by a general purpose computer 156 instead of the cams 120 to 126 of FIG. 2. In FIG. 3, information derived from the various sensing means is fed to the general purpose computer 156 by way of a cable 158. This information comprises the electrical signals derived from the several sensors 58, 60 and 62, the several position sensors for the moving elements 35, 37 and 39, such as the coil 66, the several pressure sensing means such as the elements 68, 70 and 72, the position sensors 77, 79 and 104 and the means for measuring the effort necessary to rotate the steering wheel 22 as indicated by the amount of current drawn by the motor 92. Since all this information that is fed to the computer 156 is electrical, this information may be processed so as to be acceptable by the computer 156. For example, if the computer 156 is of the digital type, the information, which is gathered in analog form, must be changed to a digital form to be acceptable by a digital computer. The digital computer 156, in a known manner, sends out electrical currents, over the cable 160 to the various electrical control elements such as the solenoids 161 to 166 which respectively operate valves 126 to 131 contained in the console 168. To prevent cluttering of the drawing, the individual wiring of each of the electrical controls 161 to 166 has been omitted from the drawing. An operator 170 for a reversing switch 172 for the steering wheel motor 92 may also be included in the console 168.

Operation of the control operating device of FIGURE 1 with the console 168 of FIG. 3 is similar to the operation described in connection with FIGS. 1 and 2. After the test apparatus is properly positioned in the car, the valve 150 is adjusted to the position where the equipment will test a standard shift automobile or to the position where it will test an automatic shift automobile. Then the test switch 162 is thrown to its on position, and the electrical information gathered by the several sensors is sent to the computer 156 over the cable 158 and control currents are sent to the several operators 161 to 166 and 170 over the cable 160. The operators 161 to 166 operate the valves 126 to 131 and the reversing switch 172 in the programmed manner set into the computer 156. If desired, a printing device 174 may be connected to the console 156 which will indicate responses by the various sensors that are not in an acceptable range to indicate that a car being tested is defective in one or more aspects.

The pressure produced by the pump 118 and the size of the pistons in the several cylinders 34, 36, 38, 76, and 78 may be so chosen that no control of the automobile will be bent or damaged. The fact that the force produced in the central cylinder will not move a control lever or pedal will in itself indicate that the car needs repairs.

Various modifications of the above described apparatus will occur to a person skilled in the art. Therefore, the above description is to be taken as illustrative and not in a limiting sense.

What is claimed is:

1. Apparatus for operating the controls of an automotive vehicle comprising
    a support,
    a plurality of control actuators mounted on said support,
    means for positioning said support in the driver's compartment of an automotive vehicle with said control actuators in operative alignment with the controls they actuate,
    said support and control actuators being insertable into and removable from said vehicle as a unit, and
    said actuators causing motion of the brake and accelerator pedals of the vehicle.

2. Apparatus for operating the controls of an automotive vehicle comprising
    a support,
    a plurality of control actuators mounted on said support,
    means for positioning said support in the driver's compartment of an automotive vehicle with said control actuators in operative alignment with the controls they actuate, said support and control actuators being insertable into and removable from said vehicle as a unit, said control actuators causing rotation of the gear shift lever of said vehicle in a plane perpendicular to the steering column of the vehicle.

3. The invention as expressed in claim 2 in which said control actuators move the end of the gear shift level in a plane through the steering column.

4. The invention as expressed in claim 2 in which means are provided to indicate the position of the gear shift.

5. The invention as expressed in claim 2 in which said control actuators also move the end of the gear shift lever in a plane through the steering column and in which means are provided to indicate the position of the gear shift lever in two planes which are perpendicular to each other.

6. Apparatus for operating the controls of an automotive vehicle comprising a support, a plurality of control actuators mounted on said support, means for positioning said support in the driver's compartment of an automotive vehicle with said control actuators in operative alignment with the controls they actuate, said support and control actuators being insertable into and removable from said vehicle as a unit, said actuators causing rotation of the steering gear, and means to indicate the effort required for rotating the steering gear at various positions thereof.

References Cited

UNITED STATES PATENTS

| | | | |
|---|---|---|---|
| 2,157,355 | 5/1939 | Shroyer | 73—132 X |
| 2,281,159 | 4/1942 | Kleisrath et al. | 192—3.5 X |
| 3,016,739 | 1/1962 | Jonach et al. | 73—117.3 |
| 3,050,994 | 8/1962 | Heigl et al. | 73—117 |
| 3,333,463 | 8/1967 | Hollinghurst | 73—117 |

RICHARD C. QUEISSER, Primary Examiner

JERRY W. MYRACLE, Assistant Examiner

U.S. Cl. X.R.

192—3.5